US010662079B1

(12) United States Patent
Wachtl (10) Patent No.: US 10,662,079 B1
(45) Date of Patent: May 26, 2020

(54) WATER PURIFICATION DEVICE

(71) Applicant: Robert Wachtl, Northfield Center, OH (US)

(72) Inventor: Robert Wachtl, Northfield Center, OH (US)

(73) Assignee: Kenichi Wachtl, Northfield Center, OH (US)

( * ) Notice: Subject to any disclaimer, the term of this patent is extended or adjusted under 35 U.S.C. 154(b) by 0 days.

(21) Appl. No.: 16/401,339

(22) Filed: May 2, 2019

Related U.S. Application Data

(60) Provisional application No. 62/797,450, filed on Jan. 28, 2019.

(51) Int. Cl.
*C02F 1/32* (2006.01)
*C02F 1/36* (2006.01)
*C02F 103/00* (2006.01)

(52) U.S. Cl.
CPC ................ *C02F 1/325* (2013.01); *C02F 1/36* (2013.01); *C02F 2103/007* (2013.01); *C02F 2201/3227* (2013.01); *C02F 2303/04* (2013.01)

(58) Field of Classification Search
CPC ...... C02F 1/325; C02F 1/36; C02F 2103/007; C02F 2201/3227; C02F 2303/04
See application file for complete search history.

(56) References Cited

U.S. PATENT DOCUMENTS

| | | | |
|---|---|---|---|
| 3,948,772 | A | 4/1976 | Ellner |
| 5,069,782 | A | 12/1991 | Moyher, Jr. et al. |
| 6,241,893 | B1 | 6/2001 | Levy |
| 6,946,651 | B1 | 9/2005 | Bohne |
| 7,544,291 | B2 | 6/2009 | Ehlers, Sr. |
| 7,862,728 | B2 | 1/2011 | Yencho |
| 8,366,936 | B1 | 2/2013 | Jones |
| 8,529,770 | B2 | 9/2013 | Yencho |
| 9,150,433 | B2 | 10/2015 | Maiden et al. |
| 9,409,799 | B2 | 8/2016 | Mehl |

FOREIGN PATENT DOCUMENTS

AU 2013260678 A1 12/2013

*Primary Examiner* — Nicole M Ippolito
*Assistant Examiner* — Hanway Chang
(74) *Attorney, Agent, or Firm* — Dominic A. Frisina (57) ABSTRACT

A water purification device utilizing ultraviolet lights and a nebulizer is provided. The device includes a tube that receives bacteria laden water at an intake end. The tube includes one or more baffles for causing turbulent flow of the water, and one or more ultrasonic nebulizers for converting the water stream into a mist. The device further includes one or more sources of germicidal ultraviolet light which may be located either inside or outside of the tube.

12 Claims, 8 Drawing Sheets

WATER PURIFICATION DEVICE

I. BACKGROUND OF THE INVENTION

A. Field of Invention

The invention generally relates to the field of potable water production devices.

B. Description of the Related Art

Safe drinking water is a luxury in many parts of the world. Worldwide, 844 million people lack access to a safe drinking water source that is within a thirty-minute round trip walking distance and 159 million people rely upon untreated surface water as their sole means of drinking water. Further, two billion people globally use a contaminated source for their drinking water. The majority of people affected by the lack of safe drinking water are impoverished and live in areas with have unreliable electricity.

There are many different contaminates that can be present in drinking water. Sediment and larger particles can be filtered out through traditional inexpensive techniques such as charcoal, sand, or even cloth filters. Unfortunately, these techniques do not remove harmful microorganisms. Another method of purification is reverse osmosis (RO). RO membranes can filter out microorganisms, however, the membranes in RO systems are delicate and easily fouled if larger particles are not filtered out, before entering the RO system. Furthermore, if the membrane is damaged microorganisms may pass through the membrane. Additionally, reverse osmosis requires significant energy inputs, which tends to make it impractical for off-grid applications.

Using chemicals to disinfect water carries its own problems. Chlorine while an excellent disinfectant, may produce hazardous trihalomethanes when it is added to water with organic contaminates. Further, the intestinal parasite *Cryptosporidium parvum* is resistant to chlorine. Iodine like chlorine is an effective agent for neutralizing microorganisms, but it is not recommended for pregnant women and people with thyroid problems.

Ultraviolet (UV) light is effective at neutralizing microorganisms. This is due to the damage that UV light causes to the microorganism's DNA. More specifically, when UV photons are absorbed by DNA, adjacent thymine bases may form reactive excited states that may dimerize, which can be fatal to the cell. If thymine dimerization occurs in a protein encoding area, it can result in an abnormal protein which increases the likelihood of death of the microorganism. Thymine dimerization can also prevent DNA replication, thus preventing the microorganism from replicating. The longer the exposure or intensity of the UV light, the more damage that will occur to the DNA of the microorganisms, thus resulting in death to the microorganisms and in higher levels of purification. Additionally, unlike chemical disinfectants a benefit of UV disinfection is that it cannot taint the water with dangerous chemical residues.

Currently, many forms of UV water purification devices exist. One problem with this type of purification device is balancing energy efficiency against the need to expose entrained bacteria to a lethal dose of UV photons. For this reason, water streams are typically passed through particulate filters prior to UV exposure to minimize scattering losses. One way of further increasing UV exposure is to increase the dwell time of bacteria in the UV field. This can be accomplished by slowing the flow rate of the liquid water stream; however, this negatively impacts the output of the device.

Alternatively, the dwell time can be increased by increasing the mean path length of a bacterium through the UV field, increasing the irradiance of the field, or both. For example, it is known to increase irradiance by adding UV sources or by using higher-power UV sources. It is also known to increase path length of the UV field by spreading UV sources over a longer length. In either case, the power consumption of the device increases. Alternatively, it is known to use baffles to cause turbulent flow in the water stream, which tends to increase mean path length and thus dwell time. Such devices are limited to treating liquid water streams. Some embodiments of the present invention may provide one or more benefits or advantages over the prior art.

II. SUMMARY OF THE INVENTION

Embodiments of the invention may relate to a water purification device, comprising: a tube defining an elongate shape and having a lumen defined by one or more walls; a water in-take end of the tube defining an opening fluidly communicable with external fluidics and with the lumen; a water out-put end of the tube defining an opening in fluid communication with the lumen and a space external to the water purification device; a baffle disposed within the lumen and having a major perimeter sealingly affixed to the one or more walls of the tube, wherein the baffle defines a frusto-conical shape; a minor perimeter of the baffle defining a central opening, wherein the minor perimeter is oriented downstream of the major perimeter; a flow interrupter cup disposed downstream of the central opening of the baffle; a major opening of the flow interrupter cup aligned in fluid communication with the central opening of the baffle; an ultrasonic nebulizer disposed downstream of the major opening of the flow interrupter cup; an ultraviolet lamp oriented to direct ultraviolet light into the lumen; and at least one support having a first end and a second end, wherein the first end is affixed to at least one of the one or more walls of the tube and the second end is affixed to the flow interrupter cup, and wherein the at least one support defines a fluid flow path around the flow interrupter cup.

According to some embodiments the ultraviolet lamp is affixed to either an inner wall of the tube or an outer wall of the tube.

According to some embodiments the tube comprises a material operably transparent to light between 200 nm and 300 nm in wavelength.

According to some embodiments the ultraviolet lamp comprises a plurality of light emitting diodes disposed on a downstream-facing surface of the baffle and oriented to direct ultraviolet light into the lumen downstream of the baffle.

According to some embodiments the tube is opaque to light between 200 nm and 300 nm in wavelength.

Some embodiments may further comprise a plurality of the baffle (106) and the flow interrupter cup (110) arranged in series and in fluid communication with each other.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

Figure 1:
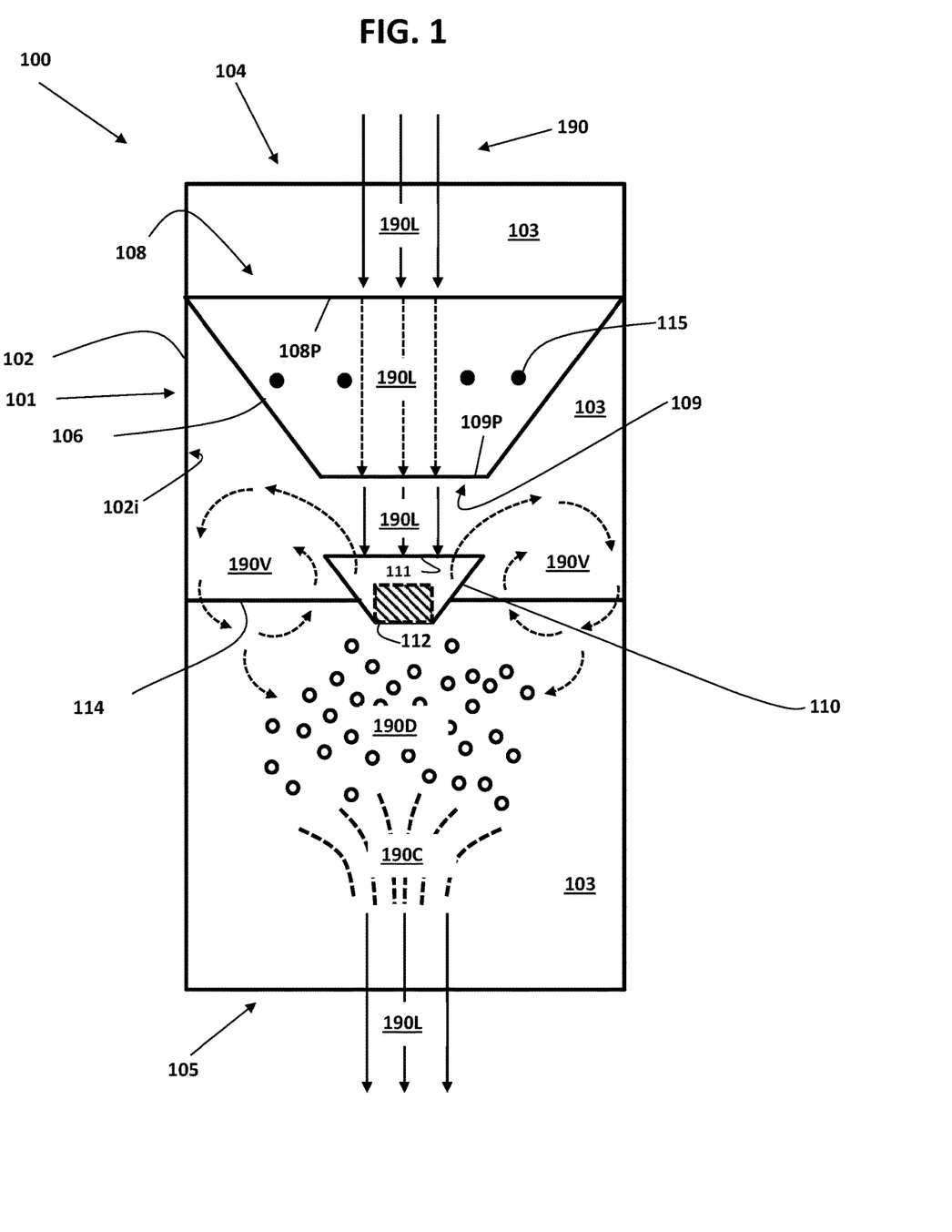
FIG. 1 is a first schematic view of an embodiment.
Figure 2:
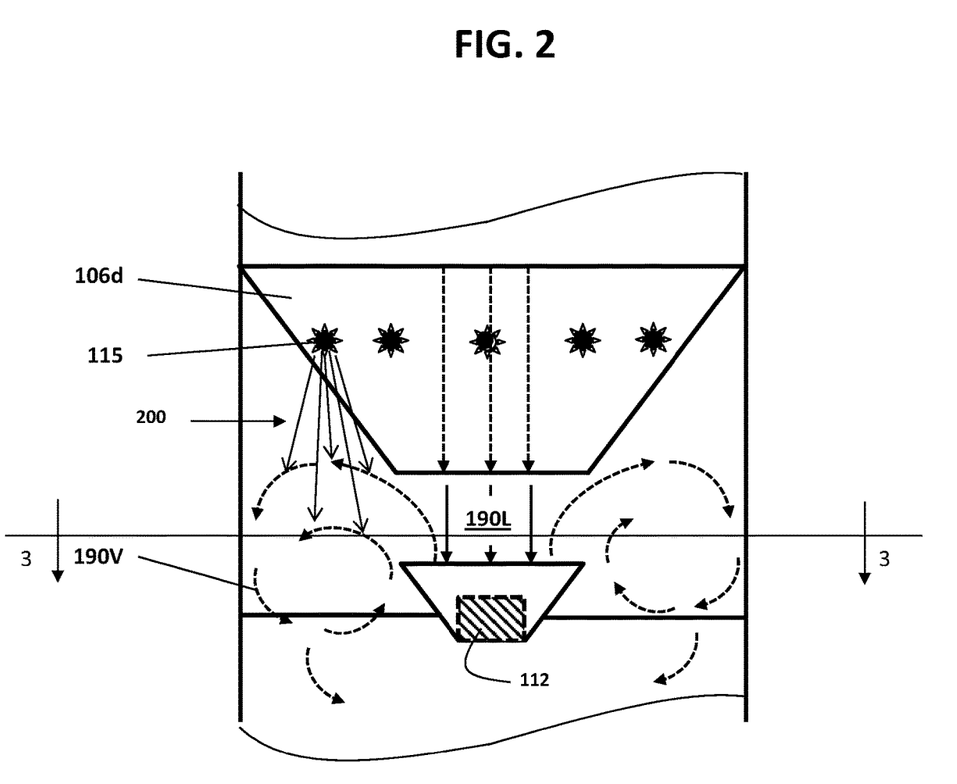
FIG. 2 is a second schematic view of an embodiment.

Referring now to the drawings wherein the showings are for purposes of illustrating embodiments of the invention only and not for purposes of limiting the same, FIG. 1 is a plan view of a simplified embodiment 100 showing the path of fluid 190 through the embodiment 100. The embodiment includes an elongate tube 101 having a wall 102 defining a central lumen 103. The tube 101 has an opening 104 at an in-take end where bacteria-laden water enters the tube 101 of the embodiment 100. The opening 104 may be in fluid communication with upstream fluidics that feed a water stream to the tube 101. For instance, such fluidics may include, without limitation, water filters, pumps, or valves. The upstream fluidics are not a part of the present invention. The tube 101 also has an opening at an opposing water out-put end 105 where sanitized water exits the tube 101. Similar to the water intake opening 104, the water output opening 105 may fluidly communicate with downstream fluidics such as, without limitation, water filters, pumps, or valves.

As a water stream 190 enters the tube 101 it may be in liquid form 190L. The liquid water 190L is received by a baffle 106. The upstream end 108 of the baffle 106 may be affixed to the inside surface of the wall 102, which is also referred to herein as the inner wall 102*i*. Suitable means for affixing are well-known in the art and are those which prevent water from flowing between the major perimeter 108P of the baffle 106 and the inner wall 102*i*. For instance, and without limitation, the baffle 106 may be welded to the inner wall 102*i*, bonded to the inner wall 102*i*, interference-fitted to the inner wall 102*i*, and may even seal by means of a gasket interposed between the major perimeter 108P of the baffle 106 and the inner wall 102*i*. Moreover, the skilled artisan will appreciate that a baffle 106 may said to be affixed to the inner wall 102*i*, within the meaning of affixed adopted herein, even if the baffle 106 and inner wall 102*i* are a unitary part lacking seams, welds, or discontinuities of any kind. Further, the baffle 106 being affixed in any manner within the meaning of "affixed" adopted herein are thus sealingly affixed.

The baffle 106 illustrated in FIG. 1 has an inverted frustoconical shape with the top and base of the inverted frustum being open so as to allow fluid 190 to flow therethrough. The baffle 106 includes a minor perimeter 109P defining a central opening 109 downstream of the major perimeter 108P. The central opening 109 communicates liquid water 190L from the baffle to the luminal space downstream of the baffle, the liquid water being received by a flow interrupter cup 110. The cup 110 is illustrated as an inverted frustum, however the skilled artisan will readily appreciate that the shape is not critical. What is important is that the flow interrupter cup 110 is adapted to receive fluid flowing from the baffle 106 while permitting nebulized fluid to escape the cup, as will be described next.

The flow interrupter cup 110 includes a major opening 111 which is aligned in fluid communication with the central opening 109, and thus receives the liquid water 190L flow from the central opening 109. An ultrasonic nebulizer 112 is disposed in the base of the flow interrupter cup 110 and converts at least a portion of the liquid water flow 190L to water mist and vapor 190V. As shown in FIG. 1, the water mist and vapor 190V escape the cup 110, circulate in the luminal space 103, and are free to flow downstream of the support arm 114. The water mist and vapor 190V continue downstream and begin to condense and coalesce to form larger droplets 190D, which further condense and coalesce 190C eventually reforming the liquid water stream 190L which exits the tube 102 through the output opening 105.

FIG. 2 is a partial view of the embodiment shown in FIG. 1 focusing on the disinfecting functionality of the UV lamps 115. The UV lamps 115 are disposed on a downstream-facing surface 106*d* of the baffle 106. Accordingly, the UV lamps are oriented so as to direct ultraviolet (UV) light rays 200 downstream into the water vapor/mist 190V formed by the ultrasonic nebulizer 112. The UV light source 115 of the embodiment illustrated in FIG. 2 may be, without limitation, light emitting diodes (LED). One skilled in the art will appreciate that other types of UV lamps may be appropriate according to their operating characteristics and make a design choice based upon those characteristics. Additionally, the UV lights should have a spectral output in the UV-C range, which it generally defined as between 100 to 280 nm; however, as a practical matter only the output above roughly 200 nm is useful because the extinction coefficient of water grows rapidly from about 200 nm. Moreover, it is known to those skilled in the art that a UV dosage effective for disinfection is between about 1 mJ/cm$^2$ and 20 mJ/cm$^2$. Due to the nonlaminar turbulent flow of the water vapor/mist 190V produced by the nebulizer 112, infectious agents like bacteria and viruses spend more time in optical communication with the UV lamps 115 than they would if the flow were laminar. Thus, the UVlamps 115 can more efficiently sanitize the water.

Figure 3:
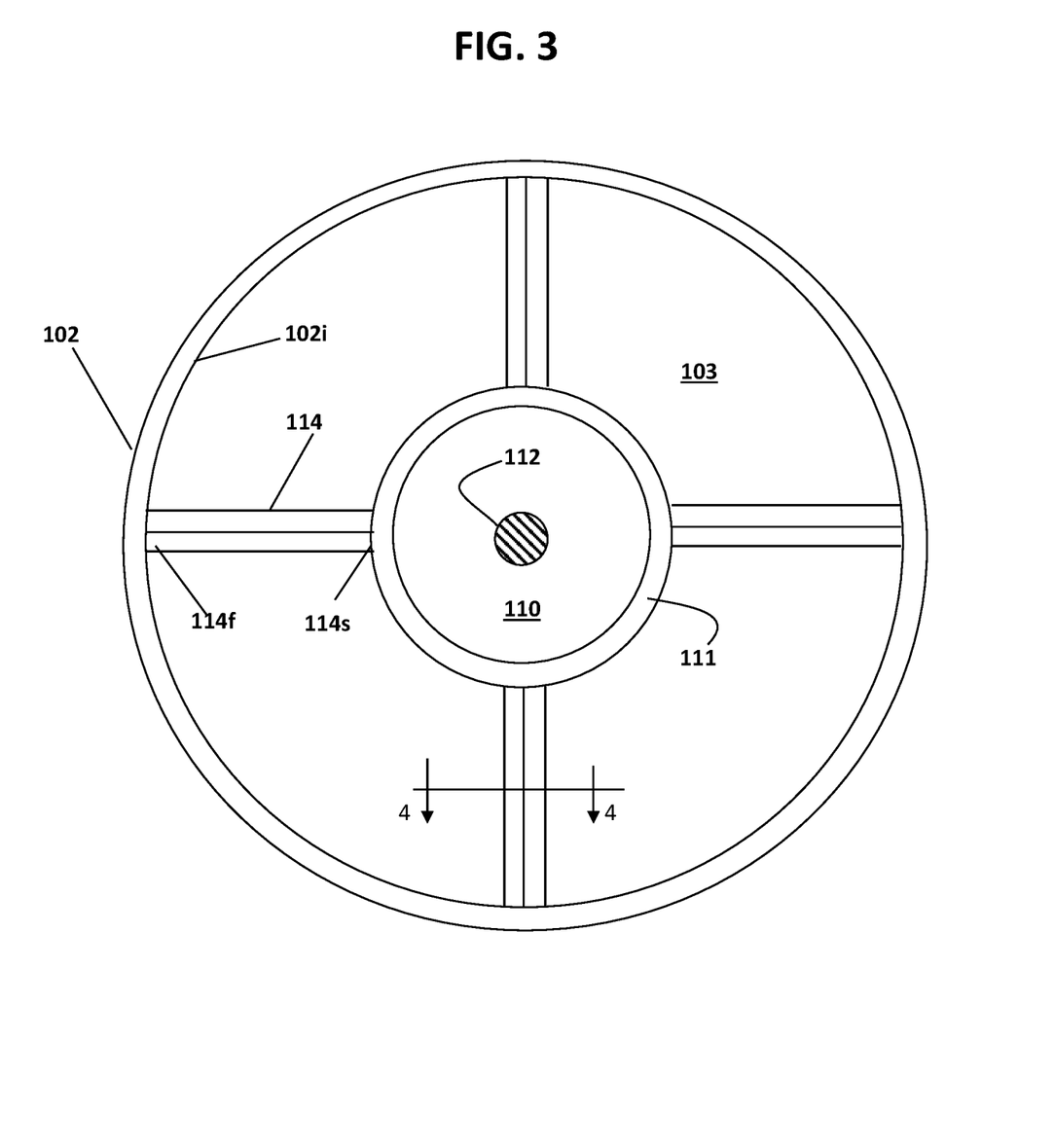
FIG. 3 is a cross sectional view of the embodiment of FIG. 2 taken along line 3-3.
Figure 4:
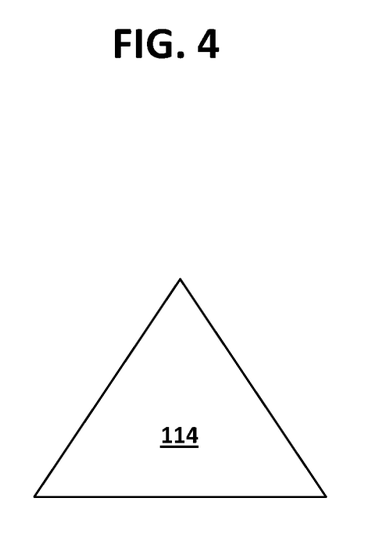
FIG. 4 is a cross-sectional view of a support arm taken along line 4-4 in FIG. 3.

FIG. 3 is a cross sectional view of the embodiment of FIG. 2 taken along line 3-3. This figure further illustrates the structure of the flow interrupter cup 110 and the support arms 114. The cup 110 defines an annular major opening 111 which receive a water stream from the central opening 109 (see FIG. 2). The ultrasonic nebulizer 112 is shown in a central position at the base of the cup 110. The nebulizer is thus downstream of the major opening. The cup has a closed bottom, so nebulized water mist would exit through the major opening 111 as shown in more detail in FIGS. 1 and 2. The cup 110 is fixed in position within the tube 102 by four support arms 114. The support arms 114 have a first end 114ƒ affixed to the inner surface 102i of the tube 102, and a second end affixed to the cup 110. The arms 114 being elongated bars extending radially from the cup, much luminal space 103 is left permitting the free flow of water mist/vapor to proceed downstream of the arms 114. FIG. 4 illustrates the cross-sectional geometry of the support arms. The skilled artisan will readily appreciate that the cross-sectional geometry is not critical, and any suitable shape will suffice as a matter of design choice. However, a wedge shape such as the one illustrated in FIG. 4 may be advantageous because facing the apex of the wedge against the flow of water tends to decrease hydrodynamic resistance. Such features may be especially suitable in applications with many pairs of baffles 106 and flow interrupter cups 110.

Figure 5:
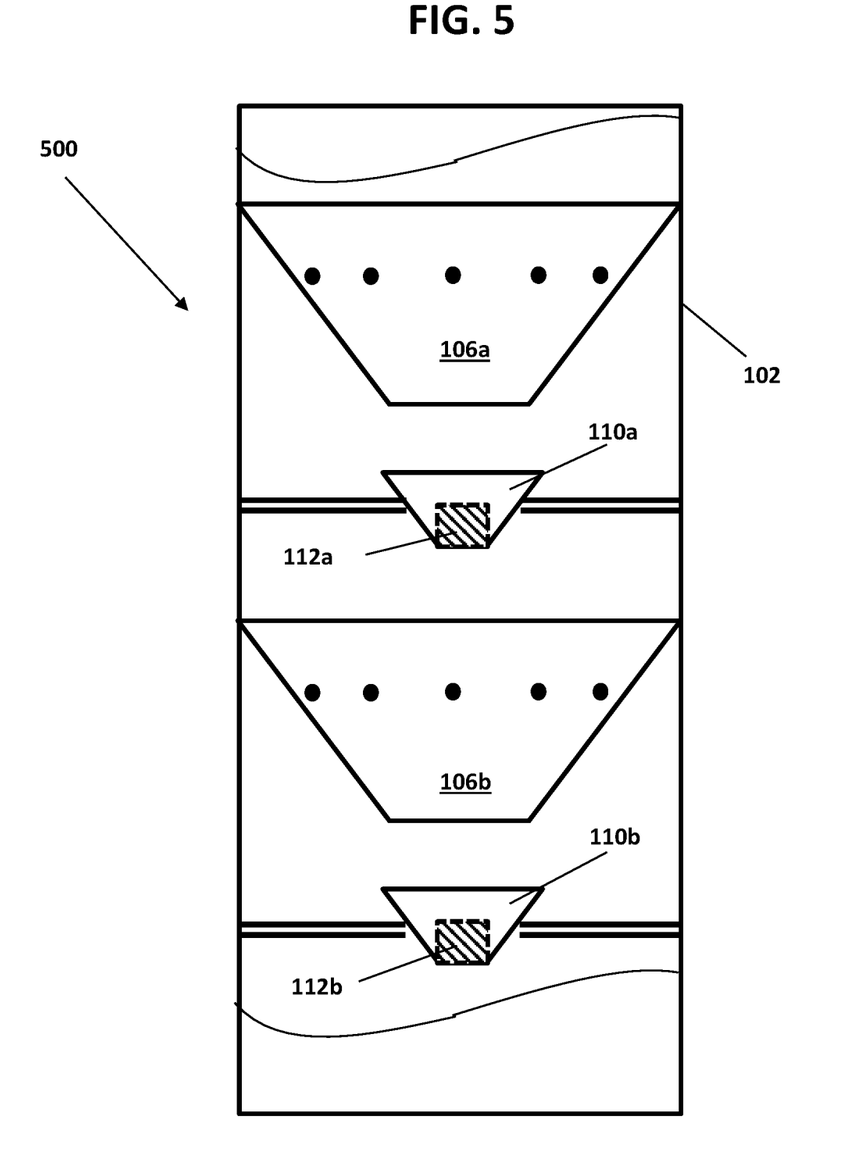
FIG. 5 is a schematic view of an embodiment 500 showing a plurality of pairs of baffles and flow interrupter cups.

FIG. 5 is a schematic view of an embodiment 500 illustrating that the simplified embodiment shown in FIG. 1 can be expanded to include a series of baffle-cup pairs (106a and 110a, and 106b and 110b), and each flow interrupter cup 110a, 110b includes an ultrasonic nebulizer 112a, 112b. The drawing is truncated at either end of the tube 102 but may include any number of pairs. Thus, according to FIG. 5 water flows through the embodiment 500 repeatedly converting from liquid to mist/vapor and back to liquid as illustrated more clearly in FIG. 1. The appropriate number of baffle-cup pairs will vary from one embodiment to another depending on factors such as flow rate, the radiant output of the UV LEDs, and the amount of infectious agent that must be killed. Only two pairs are shown in FIG. 5; however, this is merely for the purpose of illustrating the pattern of the arrangement of parts.

The person having ordinary skill in the art will appreciate that embodiments of the invention may be constructed according to a wide variety of approaches. For example, and without limitation, an elongate tube may receive one or more baffles 106 and one or more corresponding flow interrupter cups 110 as inserts. The inserts may be positioned in the tube at predetermined positions with a plunger or similar tool and may be fixed in position according to know means, such as without limitation crimping, welding, or fastening or may even be held in place by friction alone as in an interference fit. The person having ordinary skill in the art will also appreciate that power may be supplied to the UV lamps 115 and ultrasonic nebulizers 112 through well-known means including, without limitation, one or more conductors embedded in the elongate tube 101, baffles 106, and cups 110.

Figure 7:
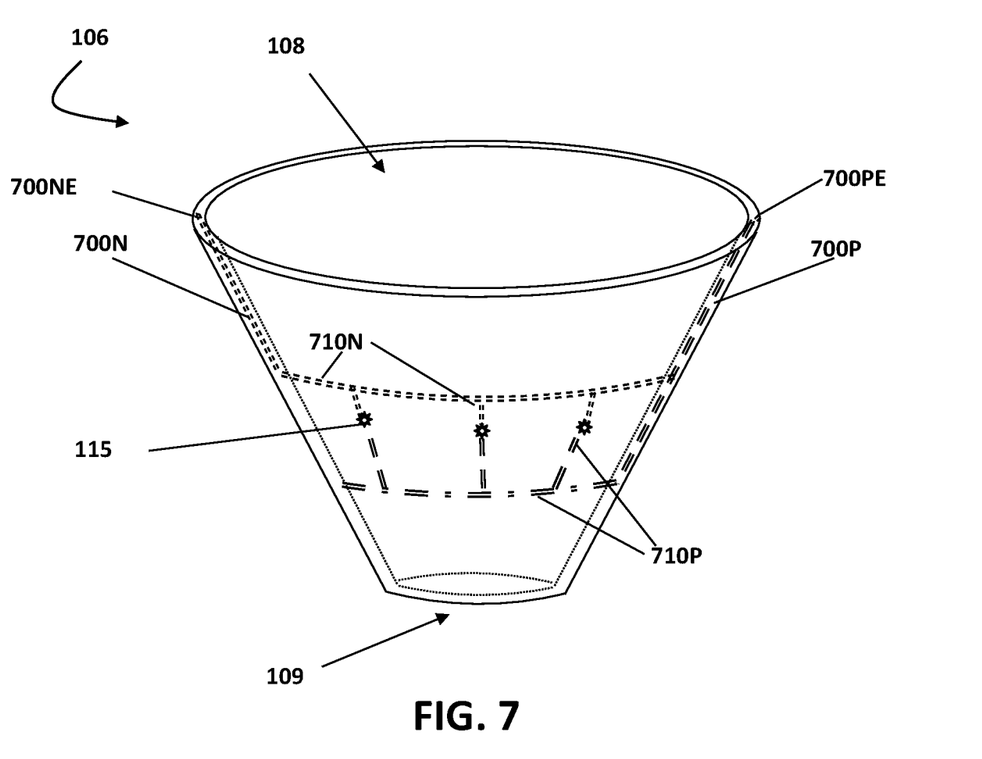
FIG. 7 is a semitransparent perspective view of a baffle according to one embodiment.
Figure 8:
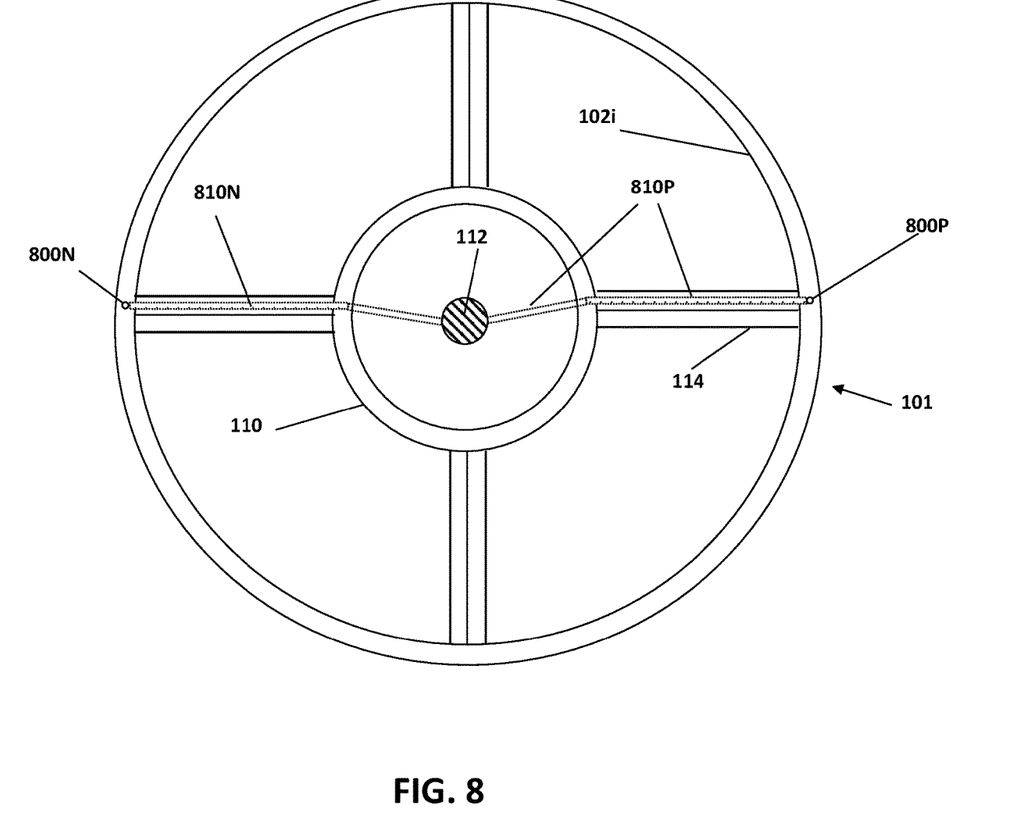
FIG. 8 is a semitransparent view of the cross-sectional view shown in FIG. 3.

FIGS. 7 and 8 illustrate how conductors may be incorporated into an embodiment to power the electronic components thereof. In FIG. 7 a baffle 106 is shown in a semi-transparent elevation view exposing internal conductors. Similarly, FIG. 8 is the same cross-sectional view of FIG. 3 but in semi-transparency to show internal conductors. With particular reference to FIG. 7, a negative bare conductor strip 700N runs from an entry point 700NE to a horizontal lead 710N running circumferentially around the baffle 106. The entry point 700NE thus serves as an electrical contact point where power is supplied to the baffle. It will be readily understood and well-within the ordinary skill of the art to include structures to shield the conductor from the surrounding water. The person having ordinary skill in the art may select from a wide variety of well-known structures as a matter of design choice.

With continuing reference to FIG. 7, the horizontal branch 710N of the negative bare conductor strip 700N connects to the negative terminals (not shown) of the UV lamps 115. Positive leads 710P connect to the positive terminals (not shown) of the lamps 115 and run circumferentially to a vertical main branch 700P. The positive lead 700P is shown breaking the surface at entry point 700PE. Similar to the negative entry point 700NE, structure 700PE serves as an electrical contact point where power is supplied to the baffle.

The person having ordinary skill in the art will readily appreciate that the structures shown in FIGS. 7 and 8 and described here are merely one illustrative example of how power could be routed. For instance, the bare conductor strips 700N and 700P described here could be substituted for insulated wires. Furthermore, where insulated conductors are chosen, they may be routed on the surface of the baffles 106 and other structures rather than being embedded in the structures because exposure to water would not cause a short.

With regard to FIG. 8, positive 810P and negative 810N conductor strips are shown embedded in the flow interrupter cup 110 and running radially outward from the positive and negative terminals (not shown) of the ultrasonic nebulizer 112 and through in the support arms 114. The conductors 810P, 810N are shown making electrical contact with corresponding power supply lines 800N and 800P embedded in the wall of the elongate tube 101. The supply lines 800N and 800P are shown in cross-section running longitudinally along the length of the tube 101 and connect to an external power supply (not shown) according to known means. Similar to the conductors in FIG. 7 discussed above, some or all of the conductors of FIG. 8 may be substituted for wires, and/or may be routed on the surface of the flow interrupter cups 110, support arms 114, and the elongate tube 101.

Embodiments of the invention may be constructed according to any of a wide variety of well-known means as will be readily understood by the person having ordinary skill in the art. In one non-limiting example, each pair of baffles 106 and flow interrupter cups 110 may comprise a unitary molded part. A unitary construction lends itself to joining the units end-to-end according to known means so as to construct a purification tube of arbitrary length. The ability to construct a tube having a selectable number of units allows one to construct an embodiment according to the disinfecting requirements of a given application. For instance, higher bacteria content will require more units and thus consume more power, whereas lower bacteria contents will require fewer units and can consume less power. In one embodiment, the units have male and female threads on either end so that the tube 101 can be assembled and later adjusted, adding and removing units as needed.

While the foregoing example assumes that the ultrasonic nebulizer 112 and the UV lamps 115 can use the same power source, it would be a trivial matter of design choice to add a second power supply with corresponding lines so that the nebulizer 112 and UV lamps 115 can operate from different sources. This may be advantageous in embodiments using UV LED lamps in order to accommodate the driver electronics typically required for operating LED lamps.

Figure 6:
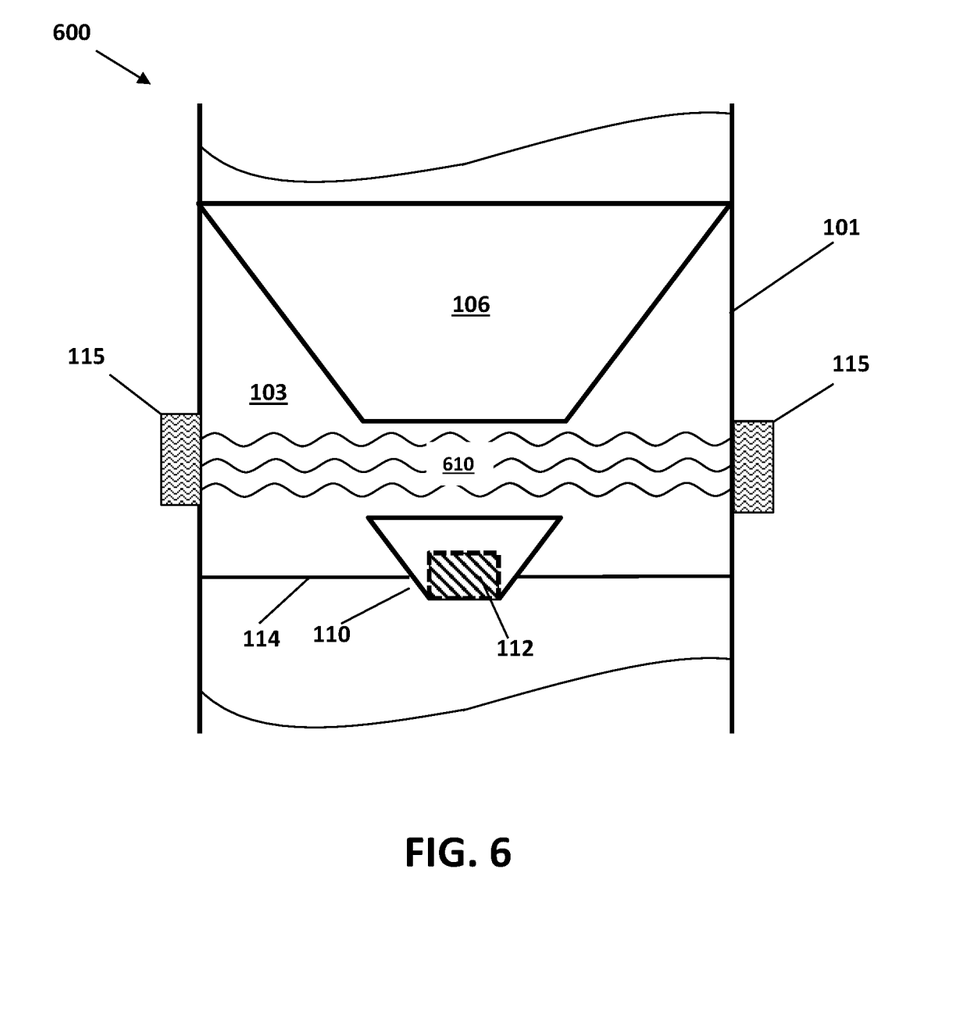
FIG. 6 is a schematic view of an embodiment 600 showing UV sources disposed exterior to the tube.

FIG. 6 is a schematic view of an embodiment 600 having the UV lamps 115 on the outside surface of the elongate tube 101. Accordingly, the tube 101 comprises a UV transparent material such as fused silica or quartz. While material choice need not be limited to these two materials, whatever material is selected should be operably transparent to light between 200 nm and 300 nm in wavelength. A material is operably transparent within this wavelength range if it passes enough photons to allow the device to perform its germicidal function. Accordingly, operably transparent materials need not pass 100% of photons between 200 to 300 nm. The lamps 115, which may be installed in any suitable number, are directed inward into the luminal space 103. Thus, a UV field is established in the space where nebulized water must pass as it flow through the system. A variety of UV light sources may be selected as a matter of design choice. For instance, and without limitation, suitable germicidal UV light sources include light emitting diodes, or various fluorescent lamps e.g. mercury discharge lamps.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A water purification device (100), comprising:

a tube (101) defining an elongate shape and having a lumen (103) defined by one or more walls (102);

a water in-take end (104) of the tube (101) defining an opening fluidly communicable with external fluidics and with the lumen (103);

a water out-put end (105) of the tube (101) defining an opening in fluid communication with the lumen (103) and a space external to the water purification device (100);

a baffle (106) disposed within the lumen (103) and having a major perimeter (108P) sealingly affixed to the one or more walls (102) of the tube (101), wherein the baffle (106) defines a frustoconical shape;

a minor perimeter (109P) of the baffle (106) defining a central opening (109), wherein the minor perimeter (109P) is oriented downstream of the major perimeter (108P);

a flow interrupter cup (110) disposed downstream of the central opening (109) of the baffle (106);

a major opening (111) of the flow interrupter cup (110) aligned in fluid communication with the central opening (109) of the baffle (106);

an ultrasonic nebulizer (112) disposed downstream of the major opening of the flow interrupter cup (110);

an ultraviolet lamp (115) oriented to direct ultraviolet light into the lumen (103); and at least one support (114) having a first end and a second end, wherein the first end is affixed to at least one of the one or more walls (102) of the tube (101) and the second end is affixed to the flow interrupter cup (110), and wherein the at least one support (114) defines a fluid flow path around the flow interrupter cup (110).

2. The water purification device of claim 1, wherein the ultraviolet lamp is affixed to either an inner wall of the tube or an outer wall of the tube.

3. The water purification device of claim 2, wherein the tube comprises a material operably transparent to light between 200 nm and 300 nm in wavelength.

4. The water purification device of claim 1, wherein the ultraviolet lamp comprises a plurality of light emitting diodes disposed on a downstream-facing surface of the baffle and oriented to direct ultraviolet light into the lumen downstream of the baffle.

5. The water purification device of claim 1, wherein the tube is opaque to light between 200 nm and 300 nm in wavelength.

6. The water purification device of claim 1, further comprising a plurality of the baffle (106) and the flow interrupter cup (110) arranged in series and in fluid communication with each other.

7. A water purification device (100), comprising:

a tube (101) defining an elongate shape and having a lumen (103) defined by one or more walls (102);

a water in-take end (104) of the tube (101) defining an opening fluidly communicable with external fluidics and with the lumen (103);

a water out-put end (105) of the tube (101) defining an opening in fluid communication with the lumen (103) and a space external to the water purification device (100);

a baffle (106) disposed within the lumen (103) and having a major perimeter (108P) sealingly affixed to the one or more walls (102) of the tube (101), wherein the baffle (106) defines a frustoconical shape;

a minor perimeter (109P) of the baffle (106) defining a central opening (109), wherein the minor perimeter (109P) is oriented downstream of the major perimeter (108P);

a flow interrupter cup (110) disposed downstream of the central opening (109) of the baffle (106);

a major opening (111) of the flow interrupter cup (110) aligned in fluid communication with the central opening (109) of the baffle (106);

an ultrasonic nebulizer (112) disposed downstream of the major opening of the flow interrupter cup (110); and a plurality of ultraviolet lights (115) disposed on a downstream-facing surface (106*d*) of the baffle (106) and oriented to direct ultraviolet light into the lumen (103) downstream.

8. The water purification device of claim 7, further comprising a plurality of the baffle (106) and the flow interrupter cup (110) arranged in series and in fluid communication with each other.

9. A water purification device (100), comprising:

an ultraviolet light operably transparent tube (102C) defining an elongate shape and having a lumen (103) defined by one or more walls (102);

a water in-take end (104) of the tube (101) defining an opening fluidly communicable with external fluidics and with the lumen (103);

a water out-put end (105) of the tube (101) defining an opening in fluid communication with the lumen (103) and a space external to the water purification device (100);

a baffle (106) disposed within the lumen (103) and having a major perimeter (108P) sealingly affixed to the one or more walls (102) of the tube (101), wherein the baffle (106) defines a frustoconical shape;

a minor perimeter (109P) of the baffle (106) defining a central opening (109), wherein the minor perimeter (109P) is oriented downstream of the major perimeter (108P);

a flow interrupter cup (110) disposed downstream of the central opening (109) of the baffle (106);

a major opening (111) of the flow interrupter cup (110) aligned in fluid communication with the central opening (109) of the baffle (106); and an ultrasonic nebulizer (112) disposed downstream of the major opening of the flow interrupter cup (110).

10. The water purification device of claim 9, further comprising a plurality of ultraviolet lamps (115) affixed to an outside surface of the operably transparent tube, wherein the plurality of ultraviolet lamps are in germicidal optical communication with the lumen.

11. The water purification device of claim 10, wherein the plurality of ultraviolet lamps are in optical communication with a portion of the lumen between the baffle and the ultrasonic nebulizer.

12. The water purification device of claim 10, further comprising a plurality of the baffle (106) and the flow interrupter cup (110) arranged in series and in fluid communication with each other.

* * * * *